(12) United States Patent
Ulmer

(10) Patent No.: US 7,208,213 B1
(45) Date of Patent: Apr. 24, 2007

(54) DECORATIVE FILM WITH INTEGRATED BREAK LINE

(75) Inventor: Helmut Ulmer, Wörth am Rhein (DE)

(73) Assignee: Sai Automotive Sal GmbH (DE)

( * ) Notice: Subject to any disclaimer, the term of this patent is extended or adjusted under 35 U.S.C. 154(b) by 567 days.

(21) Appl. No.: 10/089,474

(22) PCT Filed: Sep. 19, 2000

(86) PCT No.: PCT/EP00/09169

§ 371 (c)(1),
(2), (4) Date: Aug. 19, 2002

(87) PCT Pub. No.: WO01/23221

PCT Pub. Date: Apr. 5, 2001

(30) Foreign Application Priority Data

Sep. 30, 1999 (DE) ............ 299 17 856 U

(51) Int. Cl.
B65D 65/28 (2006.01)

(52) U.S. Cl. ............ 428/43; 428/134; 428/136; 428/158; 280/728.3; 280/732

(58) Field of Classification Search ........ 428/134, 428/136, 158, 43; 280/728.3, 732
See application file for complete search history.

(56) References Cited

U.S. PATENT DOCUMENTS

| 5,626,357 A | 5/1997 | Leonard et al. | |
| 6,065,771 A | * 5/2000 | Kawakubo et al. | ...... 280/728.3 |
| 6,106,003 A | * 8/2000 | Rahmstorf et al. | ...... 280/728.3 |

FOREIGN PATENT DOCUMENTS

| DE | 19732767 A1 | 7/1997 |
| DE | 29821409.1 | 11/1998 |
| FR | 2721876 | 1/1996 |
| JP | 02099324 | 4/1990 |
| JP | 09183373 | 7/1997 |
| JP | 10329631 | 12/1998 |

OTHER PUBLICATIONS

International Search Report for PCT/EP00/09169.

* cited by examiner

Primary Examiner—Patrick Joseph Ryan
(74) Attorney, Agent, or Firm—Young & Basile, P.C.

(57) ABSTRACT

The invention relates to a molded decorative film that can be foam-backed and that is used in the passenger compartment of motor vehicles. Said decorative film is provided with a break line that is defined by a notched weakening in cross-section in the airbag penetration area. Said weakening in cross-section is formed by an internal notch that is closed at both ends by the material of the decorative film. Preferably, a notch is produced that extends on the side that can be foam-backed to the surface of the film and the notch is then closed on said side by welding.

10 Claims, 2 Drawing Sheets

DECORATIVE FILM WITH INTEGRATED BREAK LINE

BACKGROUND OF THE INVENTION

The invention relates to a decorative film.

There is a known way of producing interior trim panels for automotive vehicles by connecting dimensionally stable supporting parts and preformed surface layers (decorative films) in special foaming tools by a layer of foam being formed (foam backing). Above all dashboard trims, door interior trim panels and passenger seats are currently manufactured in this manner. The dimensionally stable supporting parts can here consist of any materials (wood-fibre material, sheet metal), by preference however supporting parts formed from injection-moulded or pressed thermoplastics are used. The preformed surface layers can be socalled. "slush skins", i.e. moulded skins produced by sintering or a slip process in special tools, predominantly from PVC materials (see for example DE 39 32 923 A1). Skins produced by other methods from thermoplastics or thermoplastic elastomers, such as e.g. thermoformed PVC films or sprayed polyurethane skins are also usual. The invention can also be applied to skins which have a multi-layered structure, at least the inner layer of the skin, which is later in contact with the foam, having to consist of a thermoplastic material. The production and processing of skins from suitable material for the mentioned applications are familiar to the expert in this field.

Increasingly, vehicle interior trim panels have areas behind which airbags are arranged, which however are not intended to be recognised. In order to ensure defined tearing open of the decorative film in the event of the release of the airbag, it is usual to weaken the outline of the opening area of the airbag in the film, for example by scoring or laser perforation. Relevant methods are known to the expert and are not the subject matter of this document.

The notch produced e.g. by scoring—generally the cross-sectional weakening—is, so that it remains invisible, naturally introduced into the rear side of the decorative film, i.e. facing the foam backing. During the application of the foam backing, therefore, the expanding foam can penetrate into the weakening notch and bond it together again. The defined tearing forces, predetermined by the weakening, of the break line in the decorative film are thus again undefined, which means the behaviour of the tearing area of the airbag when the latter is released can no longer be predicted with the necessary reliability. A further problem arises from the fact that at the points at. which the notches are located, a diffusion of plasticisers from the decorative film into the foam backing is promoted. The durability of the physical values of the break line can be impaired by this; but also discoloration of the decorative film on the visible side cannot be excluded in the long term. In the utility model DE 298 21 409, to solve the problem of diffusion it is proposed to seal the area of the weakening notch by a protective varnish: if however a strongly adhesive protective varnish is used, which is necessary for effective sealing, bonding together of the weakening notch must also be reckoned with. In addition, a further method step is required which can only be automated with difficulty.

SUMMARY OF THE INVENTION

The object underlying the invention, therefore, is to quote a decorative film which has in the opening region of an airbag a break line predetermined by a cross-sectional weakening, in which line the danger of the foam backing bonding together the weakening notch and the danger of additional plasticiser diffusion in this region are excluded.

Because the material weakening is an internal notch which is closed at both ends by the material of the decorative film, i.e. because the rear side, facing the foam backing, of the decorative film has a closed surface, the foam backing cannot bond together the material separation, such that the defined tearing forces are preserved in every case. There is also no plasticiser diffusion in the region of the weakening notch on account of the closed boundary surface. Thus, in analogy with a notch produced by scoring, the internal notch can be continuous, corresponding to the desired course of the break line. However it is also possible, in analogy with laser perforation which is also practised, to provide a row of a large number of individual internal notches corresponding to the course of the break line. In all cases it has been demonstrated that the internal notch does not necessarily have to be continuous over the entire length of the break line; rather it is sufficient for the internal notch to be produced in sections. The position and size of the intermittent internal notch depend, in addition to the properties of the skin material used, on the geometry of the covering flap (of the penetration area of the airbag through the dashboard) or respectively the required ejection forces and generally have to be determined by experiments. Standard available equipment can be used here.

Various possible ways of realising the internal notch present themselves, it being common to them all that an open notch, which is either introduced in the original moulding process or in an additional working cycle after the production of the skin, is closed again (welded together) at the surface on the side facing the foam and thus the internal notch is produced. The closing can take place by means of various alternative methods:

1. Using a temperature-controlled bar, shaped according to the course of the break line: continuously following the entire course of the break line, or having interruptions and only going partially over the course of the break line.

2. Use of a temperature-controlled (short) welding runner which can be guided in accordance with the course of the break line.

3. Use of a temperature-controlled roller which can be guided along the course of the break line.

Bars or rollers are brought at least to the softening temperature of the decorative film and are possibly provided with a non-adhesive coating. The heating takes place expediently by electrical means (good controllability); other forms of heating are naturally not excluded.

The temperature-controlled welding tools are guided with slight pressure over the weakening notch (or the laser perforation). Through the slight contact, on the one hand the notch edges are pressed against one another and thermally welded, such that no additional welding material is required, on the other hand the notch arches in a barrel shape such that the internal material separation remains securely preserved.

Due to the temperature of the welding tools and their contact time with the film material and their contact pressure, geometrically defined welding can be carried out, and thus defined tear behaviour of the break line in the decorative film can be ensured.

The use of a shaped welding bar, with which a continuous notch can be closed in one working cycle, is problematic since the skins have a specific thickness tolerance, which is difficult to take into account when using a welding bar. Short welding runners or welding rollers on the other hand can compensate better for the thickness tolerances of the skin, for example by being guided in a resilient manner with constant contact pressure. Path guiding of the welding runners or rollers can be simply realised by their being coupled directly to the scoring blade or the laser head.

BRIEF DESCRIPTION OF THE DRAWINGS

The invention is now explained in greater detail with the aid of an embodiment reproduced in FIGS. 1 to 4. The figures show in simplified representation.

DETAILED DESCRIPTION OF THE PREFERRED EMBODIMENT

Figure 1:
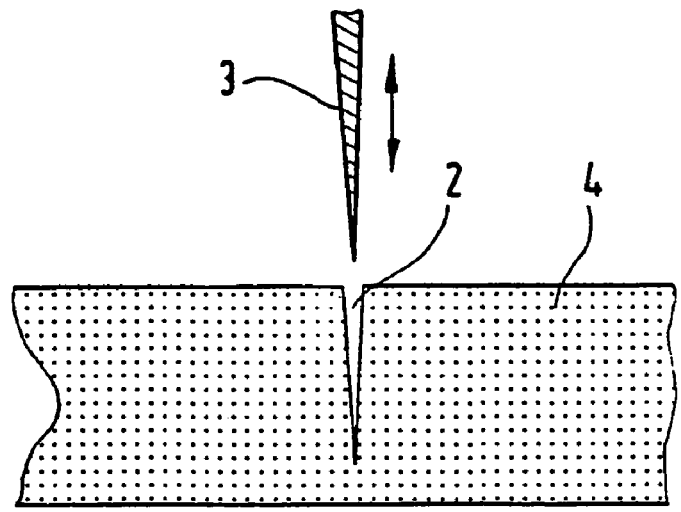
FIG. 1 a section through a decorative film at the site of a notch.
Figure 2:
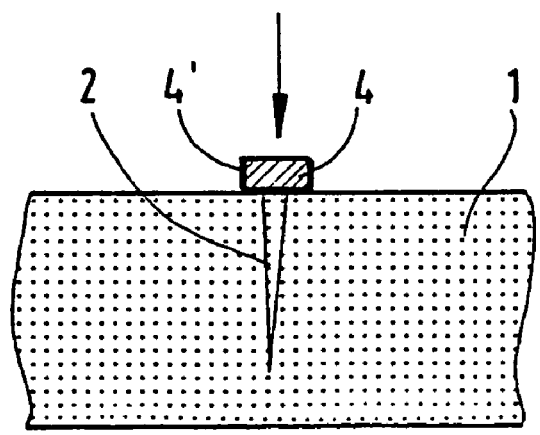
FIG. 2 the application of the welding runner, in an identical view.
Figure 3:
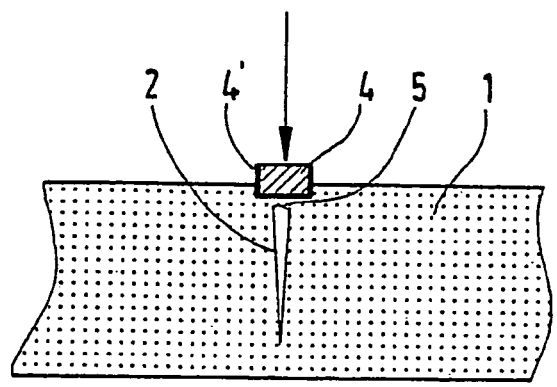
FIG. 3 the welding of the notch edges.
Figure 4:
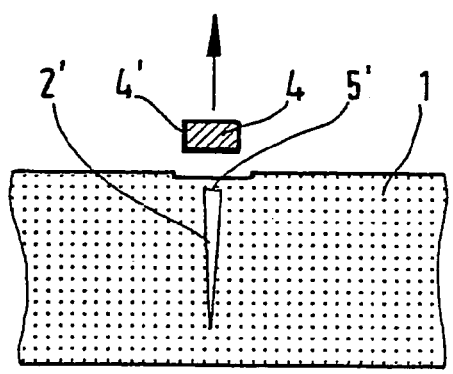
FIG. 4 the internal notch produced inside the film and predetermining the break line, and FIG. 5 a section through a two-layered decorative film.

In FIG. 1, 1 refers to the decorative film into which the notch 2 is cut e.g. by a blade 3. After the blade 3 has been removed, the heatable welding runner 4 (the heating device is not shown) is brought over the notch 2 (FIG. 2). The heating runner 4 is coated e.g. with a non-adhesive coating 4', which is not absolutely necessary, in order to prevent adhesion of the skin 1 during the welding process. Then the welding runner 4 exerts in the direction of the arrow so much pressure on the edges of the notch 2 that they are pressed together and welded in the limited region 5 (FIG. 3). After the welding runner 4 has been removed, the previously molten area rigidifies and there remains embedded in the skin as a cross-sectional weakening the internal notch 2', which is terminated by the welded region 5', such that the skin 1, despite a cross-sectional weakening of the break line, has a closed surface towards the foam backing (FIG. 4).

Figure 5:
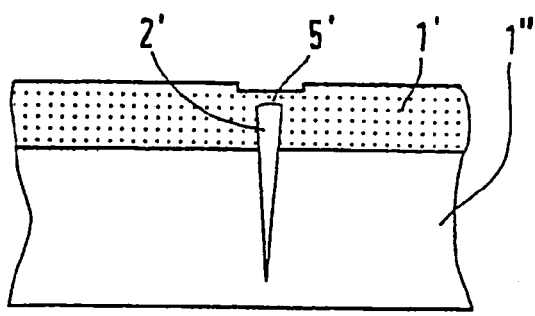

FIG. 5 shows a decorative film constructed of two layers, namely a layer 1', which is connected to the foam layer, and a layer 1" which forms the visible side of the film. The notch 2' extends respectively through a portion of layers 1' and 1", being closed at the end located in layer 1' by the welded region 5'. Layer 1' consists for this reason of thermoplastic material, whilst there is no such requirement for layer 1".

The invention claimed is:

1. Moulded decorative film having a surface attachable to a foam backing, said film for use in vehicle interiors and having a break line in a predetermined penetration area for permitting deployment of an airbag, said break line predetermined by a cross-sectional weakness, the cross-sectional weakness being a notch commencing at the surface that is attachable to the foam backing and terminating in the material of the decorative film before the side remote from the surface attachable to foam backing, characterised in that the notch at the surface attachable to the foam backing is covered by a welded region of an outer layer of the decorative film consisting of thermoplastic material, wherein the welded region is formed by welding edges surrounding the notch at the surface only.

2. Decorative film according to claim 1, characterised in that the cross-sectional weakness is a continuous internal notch following the course of the break line at least partially.

3. Decorative film according to claim 1, characterised in that the cross-sectional weakness is a row of a large number of individual internal notches following the course of the break line at least partially.

4. Decorative film according to claim 1, characterised in that the decorative film is a thermoplastic plastics material skin produced by thermoforming or form-sintering.

5. Decorative film according to claim 1, characterised in that the decorative film is a thermoplastic plastics material skin produced by an injection, casting or spraying process.

6. Decorative film according to claim 1, characterised in that the decorative film is constructed of at least two layers, wherein at least the layer having the surface attachable to the foam backing consists of thermoplastic material.

7. A moulded decorative film for use in vehicle interiors having a first surface and a second opposing surface, said first surface attachable to a foam backing, said film comprising:

a penetration area for permitting deployment of an airbag, said penetration area having a break line defined by a cross-sectional weakness in the film, said cross-sectional weakness including a notch commencing in the first surface and terminating in the film before the second surface, wherein edges of the notch at the first surface only are pressed together and welded for covering the notch and for providing a break line within the decorative film commencing and terminating completely within the first and second surfaces of the film.

8. Decorative film according to claim 7, wherein the cross-sectional weakness is a continuous internal notch following at least partially the course of the break line.

9. Decorative film according to claim 7, wherein the film is a thermoplastics plastic material skin produced by one of thermoforming, form-sintering, an injection process, a casting process and a spraying process.

10. Decorative film according to claim 7, wherein the film is constructed of at least two layers, at least the layer having the first surface attached to the foam backing consisting of thermoplastic material.

* * * * *